US005112430A

United States Patent [19]

Hudson

[11] Patent Number: 5,112,430

[45] Date of Patent: May 12, 1992

[54] APPARATUS FOR APPLYING A SHEET TO A SUBSTRATE

[75] Inventor: Donald R. Hudson, West Monroe, La.

[73] Assignee: Riuerwood International Corporation, Denver, Colo.

[21] Appl. No.: 502,394

[22] Filed: Mar. 30, 1990

[51] Int. Cl.[5] .......... B32B 31/04

[52] U.S. Cl. .......... 156/556; 156/567; 156/568; 156/569; 156/570; 156/571

[58] Field of Search .......... 156/497, 521, 552, 556, 156/567, 568, 569, 570, 571, DIG. 1, DIG. 2, DIG. 29, DIG. 30, DIG. 31, DIG. 32, DIG. 38

[56] References Cited

U.S. PATENT DOCUMENTS

| | | | |
|---|---|---|---|
| 2,449,298 | 9/1948 | Hoppe | 156/568 |
| 3,723,228 | 3/1973 | Schaltegger | 156/571 |
| 4,293,365 | 10/1981 | Geyser et al. | 156/571 |
| 4,508,330 | 4/1985 | Jorss | 156/568 |
| 4,876,839 | 10/1989 | Honda et al. | 156/521 |

FOREIGN PATENT DOCUMENTS

| | | | |
|---|---|---|---|
| 1271616 | 6/1968 | Fed. Rep. of Germany | 156/DIG. 30 |

*Primary Examiner*—Caleb Weston
*Attorney, Agent, or Firm*—Cornelius P. Quinn

[57] ABSTRACT

Apparatus for placing a coupon or other small sheet onto a predetermined location of moving substrate, such as a carton blank. A coupon supply hooper and a glue station are radially spaced about the path of rotation of vacuum gripping heads mounted on opposite ends of a rotating support arm. The gripping heads are fixed to shafts which are caused to rotate by planetary gears. The gear movement causes the gripping heads to be fully extended when they reach the hopper, the glue station and the moving substrate and to have a composite angular motion enabling the entire bottom surface of the coupon to be parallel to the substrate when the coupon contacts the substrate.

15 Claims, 3 Drawing Sheets

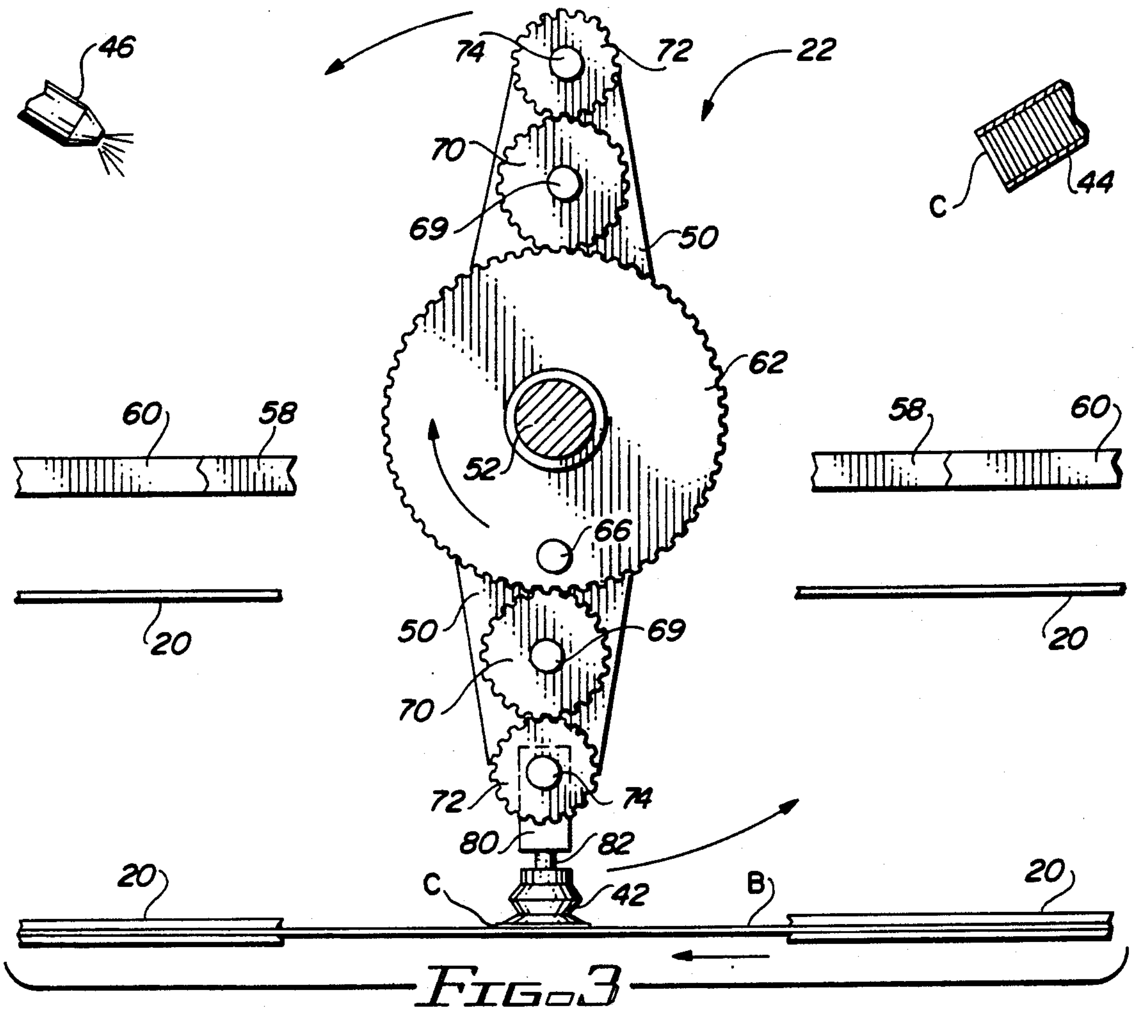
FIG. 3
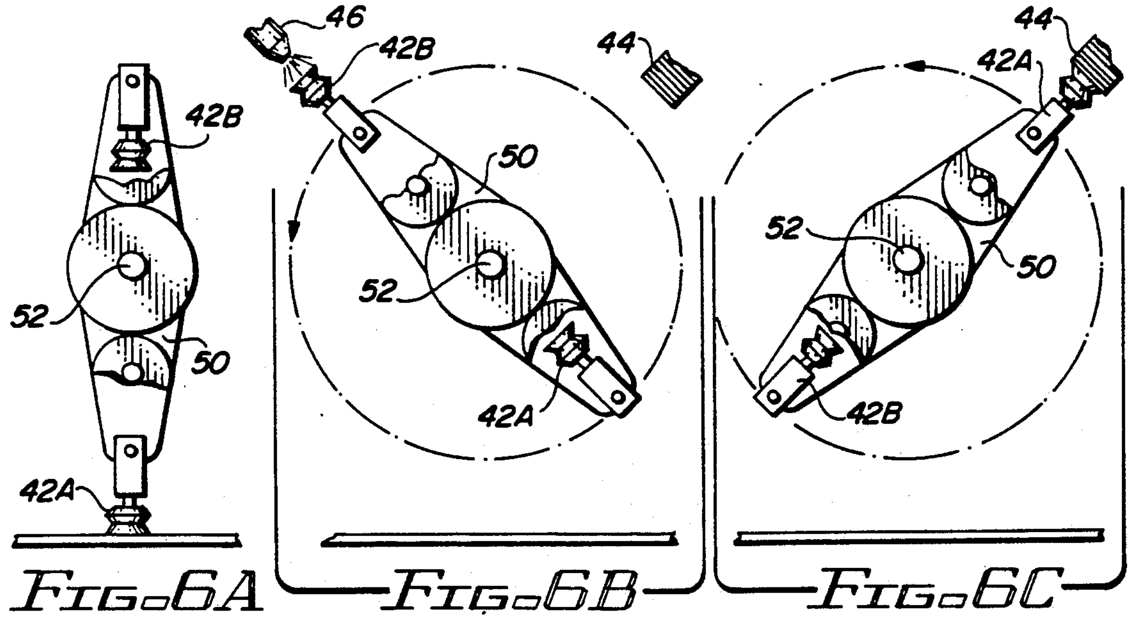
FIG. 6A
FIG. 6B
FIG. 6C

APPARATUS FOR APPLYING A SHEET TO A SUBSTRATE

FIELD OF THE INVENTION

This invention relates to apparatus for applying a strip or sheet of material to a substrate. More particularly, it relates to apparatus capable of continuously applying such material to predetermined locations on rapidly moving substrates.

BACKGROUND OF THE INVENTION

Packaging machines capable of applying labels to cartons or other containers have been in use for many years. In general, they perform satisfactorily, applying labels or other sheets of indicia to containers at a reasonably rapid rate and in accordance with the range of accuracy demanded by the operation.

Marketing strategies in some areas, such as the beverage field, for example, require a coupon to be placed in the carton as part of a contest or lottery. A coupon must be in every carton, to enable each purchaser of a carton to obtain a coupon. This means that it must be located in all cartons at substantially the same point. If it is not, it would be an indication that the coupon is either being placed at locations in the carton slightly progressively spaced from each other, signifying that at some point in the packaging operation a carton will pass through the application station without receiving a coupon, or is failing to be applied to each carton. In either case the coupon application operation would be unsatisfactory.

This type of operation is especially difficult to carry out in the beverage industry because of the extremely high speeds at which cartons are sent through the packaging machines. In such an operation coupons would be applied to a carton blank before the blank has been wrapped around the beverage containers to form a carton. Because of the high speeds involved and the need to attach a coupon to each carton blank, apparatus which utilizes a simple rotating arm to grip and deposit a coupon would not be satisfactory. Such equipment does not have the degree of reliability required by the operation because the initial contact of the coupon with the substrate is necessarily at an angle to the substrate due to the arc through which the coupon gripping means travels. It would be more reliable if the coupon could be presented to the blank in parallel relationship to the blank so that the coupon fully engages the blank at initial contact. Such an operation with presently available equipment would not, however, be able to keep up with the speeds of modern packaging machines.

It would be desirable to have an economical but effective coupon placer available to use in the manner described.

BRIEF SUMMARY OF THE INVENTION

The invention comprises a support arm fixed to a rotating shaft and arranged so that the end of the rotating support arm nearest the moving substrate moves in a direction opposite the direction of movement of the substrate. A second shaft is attached to the support arm at a location spaced from the rotating shaft, and sheet holding or gripping means are mounted on the second shaft. Means are provided to rotate the second shaft in a manner to cause sheet holding means mounted thereon to present its sheet to the moving substrate so that the sheet is substantially parallel to the substrate. Means are also provided to cause the sheet holding means to release the sheet upon reaching a predetermined point on the substrate.

Preferably, vacuum means are provided for picking up a sheet and holding it until released to the substrate, and a glue station applies glue to the sheet before the sheet reaches the substrate. Rotation of the second shaft is caused by a planetary gear arrangement which in the preferred embodiment comprises a stationary gear about which an intermediate gear travels. A planetary gear meshing with the intermediate gear rotates the second shaft to control its rotation as the support arm rotates with the main rotating shaft.

Preferably, two intermediate gears and two planetary gears are provided in order to have two sheet holders mounted at opposite ends of the rotating support arms. The number of gear teeth on the fixed gear is correlated to the number of teeth of the planetary gear to control the movement of the sheet holding means in relation to the rotation of the support arms.

This arrangement has been found to effectively apply coupons to rapidly moving carton blanks in a reliable manner so that the coupons are adhered to a predetermined location of the blanks.

The above and other aspects of the invention, as well as other benefits thereof, will readily be apparent from the more detailed description of the preferred embodiment which follows.

BRIEF DESCRIPTION OF THE DRAWINGS

FIG. 3 is a front elevation of the coupon placement device of the invention;

FIGS. 6A, 6B and 6C are sequential diagrammatic views of the overall operation of the apparatus.

DETAILED DESCRIPTION OF THE PREFERRED EMBODIMENT

Although coupons would normally be placed inside wrap-around beverage container carriers, permitting their placement onto the portion of a carton blank corresponding to the bottom panel prior to the packaging of beverage containers, it will be understood that the invention may be used to apply coupons or other strips or sheets of material to other types of substrates and to other locations on the substrates if desirable. Therefore, the terms "coupon", "strip" or "sheet" as used in this application may be considered to be interchangeable.

Figure 1:
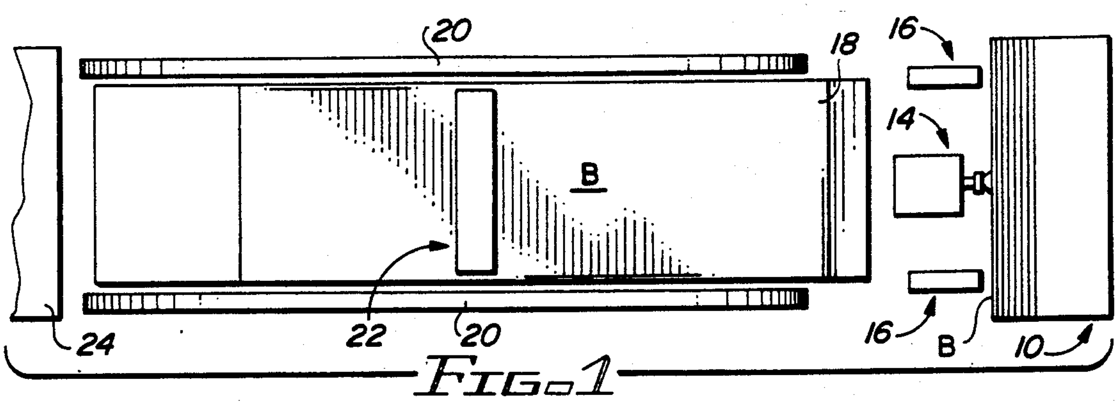
FIG. 1 is a schematic plan view of a portion of a packaging machine containing the coupon placement apparatus of the invention.

The portion of the packaging machine that performs the functions to which this invention pertains is shown schematically in FIG. 1, wherein production blank hopper 10 is spaced from the upstream end of packaging machine 12. Blank removal and delivery means 14 and 16 cause blanks B to be deposited onto the support bed 18 of the machine, with the side edges of the blanks being received between vertically arranged conveyor belts 20 which move the blanks beneath the coupon applicator device 22 and onto downstream conveyor means 24. Although the blanks B are illustrated for the purpose of this disclosure as being rectangular in shape, it will be understood that they will normally include various flaps, fold lines and openings the details of which are of no significance to the invention.

Figure 2:
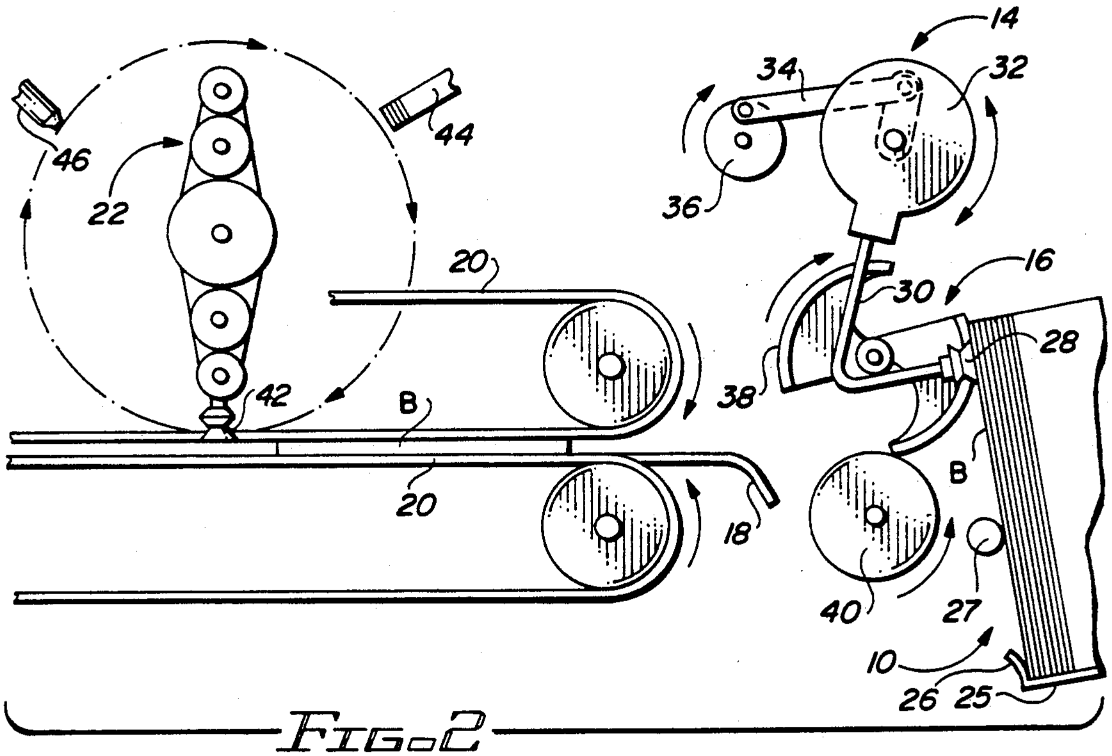
FIG. 2 is a schematic side elevation of the portion of the machine shown in FIG. 1.

Referring to FIG. 2, the blanks B are shown stacked on edge in hopper 10, which includes lower support plate 25 and front support plate 26. The next blank to be removed from the hopper is prevented from falling out by the support bar 27. Located just downstream from the hopper 10 is a suction head 28 mounted on angled arm 30 extending from pivotally mounted disc 32. The disc 32 is connected by link 34 to wheel 36 of a crank mechanism so that upon rotation of the wheel 36 the resulting oscillating motion of the disc 32 causes the angled arm 30 to move the suction head 28 toward and away from the hopper 10. Engagement of the reciprocating suction head 28 with the leading blank B will pull the blank with enough force to flex it down over the support bar 26 sufficiently so that when suction to the head 28 is cut off the blank will continue into the nip of the segment rolls 38 and the backer rolls 40 making up the blank delivery means 16. The segment rolls 38 are driven rolls while the backer rolls 40 may be freely rotatable.

In operation, the segments of the roll 38 are spaced such that they do not block the travel of a blank into the nip of the rolls but do engage the leading edge of a blank entering the nip of the rolls 38 and 40, following which the rolls propel the blank downstream. The blank is supported in this movement by support bed 18, which directs the blank into the pairs of conveyor belts 20 that move the blank downstream past the coupon applicator station. The arrangement described thus far in connection with FIG. 2 is merely typical of the manner in which blanks can be fed from a hopper to the packaging machine. It should therefore be understood that other means of accomplishing the same thing may be employed instead if desired.

Still referring to FIG. 2, the coupon applicator 22 is mounted for rotation to enable suction cup 42 to pick up a coupon from the hopper 44, deliver the coupon to the glue applicator 46 and deposit the coupon, glued-face down, onto the carton blank moving beneath the applicator.

Figure 4:
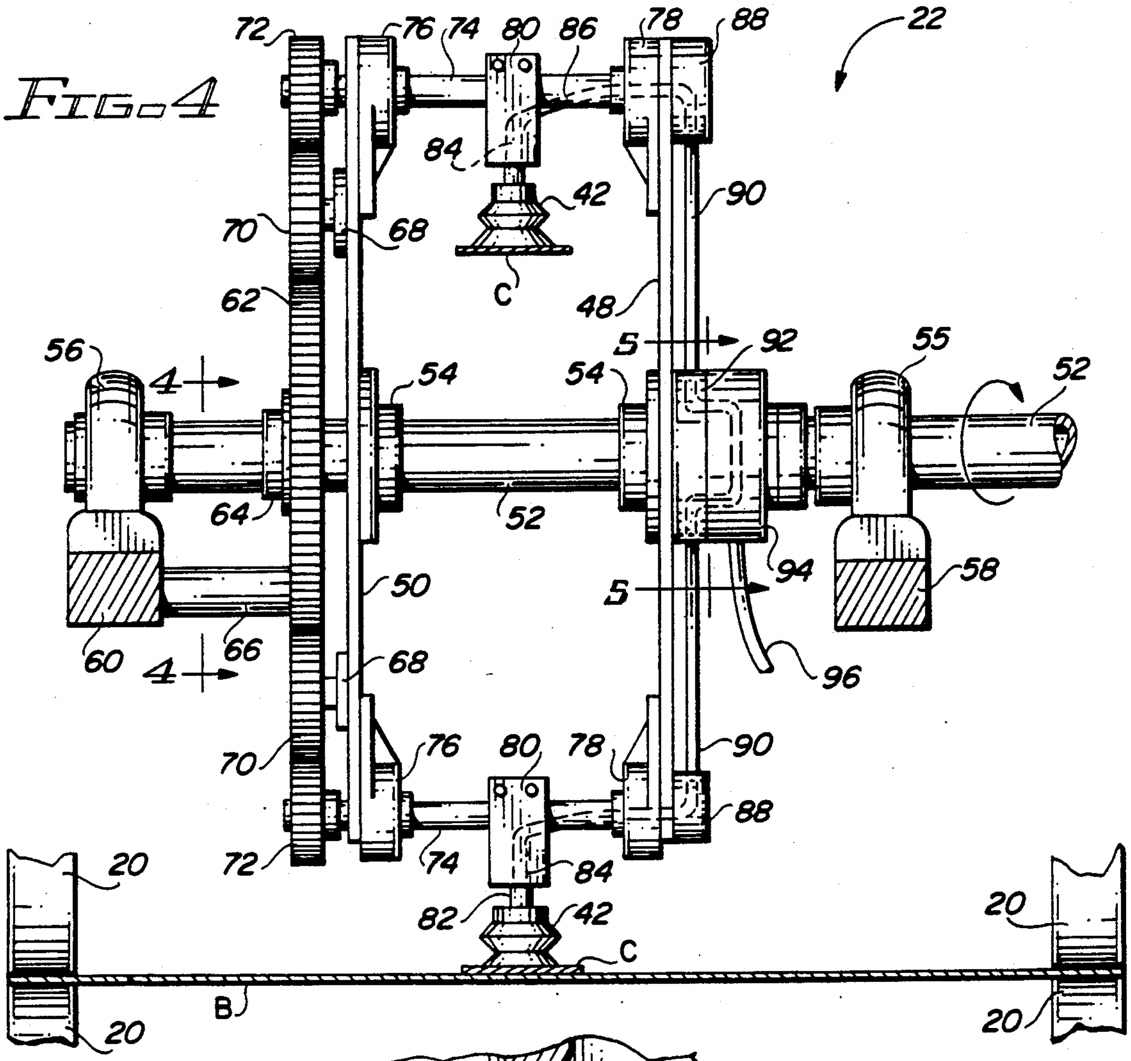
FIG. 4 is a side elevation of the device shown in FIG. 3.

The structure of the applicator which enables it to carry out these steps is shown in more detail in FIGS. 3 and 4, where it can be seen that the coupon applicator 22 comprises two support arms 48 and 50 secured at spaced locations on shaft 52 by hub mounts 54. The shaft 52, which is mounted in pillow blocks 55 and 56, is rotated by any suitable drive means, not shown, causing the support arms to rotate with it. The pillow blocks are mounted on support bars 58 and 60, which are positioned on either side of the applicator 22.

A stationary gear 62 containing a central opening is mounted on the shaft 52 between bearing 64 and, the support arm 50. To prevent the gear 62 from rotating a fixed rod 66 connects the support bar 60 and the gear 62. ,Mounted in bearings 68 attached to the support arm 50 are two freely rotatable shafts 69 which are fixed to intermediate gears 70. The intermediate gears 70 mesh with the stationary gear 62, so that as the support arms rotate, the intermediate gears 70 travel about the periphery of the fixed central gear 62. Positioned outwardly of the intermediate gears 70 are two planetary gears 72 which mesh with the intermediate gears 70 and which are fixedly mounted on planetary shafts 74. The planetary shafts 74 extend through openings in the support arm 50 and are mounted in bearings 76 and 78 adjacent the inner faces of the support arms 48 and 50. Thus, as the rotation of intermediate gears 70 causes the planetary gears 72 to rotate, the planetary shafts 74 will correspondingly rotate.

Attached by clamps to the planetary shafts 74 are mounting blocks 80 in which the tubes 82 connected to suction cups 42 are mounted. Connected to bores 84 in the mounting blocks 80 are vacuum lines 86 which connect with bores shown in dotted lines in the bearings 78. The vacuum passageways continue through openings in the support arm 48 and through sealed vacuum chambers 88. Vacuum lines 90 extend from the vacuum chambers 88 to rotating vacuum pick-up flange 92 mounted on the shaft 52. Bores in the vacuum pick-up flange 92 connect with bores in stationary vacuum valve 94, which is connected by vacuum tube 96 to a source of vacuum, not shown.

Figure 5:
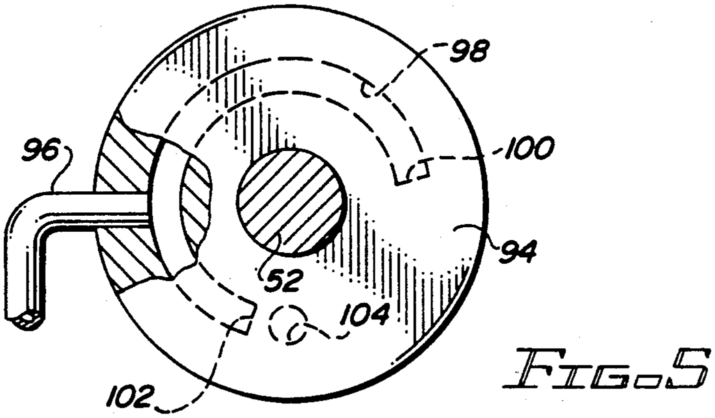
FIG. 5 is an enlarged view of the fixed vacuum valve taken along line 5—5 of FIG. 3.

The stationary vacuum valve 94 is shown in FIG. 5 to contain an arcuate bore 98 which is aligned with the bores in the rotating vacuum pick-up flange 92. When the bore of the vacuum pick-up flange connected to one of the suction cups 42 rotates into alignment with the end 100 of the arcuate bore 98, the vacuum source is connected through the vacuum path to the suction cup. Since the end 100 of the bore corresponds to the position of the coupon hopper 44, suction will be applied at the correct moment to enable the suction cup to pick up a coupon from the hopper 44. Continued rotation of the vacuum pick-up flange along the length of the arcuate bore 98 allows suction to continue to be applied to the suction cup as the cup passes the glue applicator nozzle 46 down to the point where the suction cup has reached its lowermost extended position shown in FIGS. 2, 3 and 4. At this time the bore of the rotating vacuum pick-up flange 92 passes beyond the other end 102 of the arcuate bore 98 to the exhaust port 104, which breaks the path of vacuum to the suction cup and causes the suction cup to drop the coupon at the precise time that the predetermined location on the moving carton blank is contacted by the coupon.

Referring back to FIG. 4, it will be appreciated that when the support arm 50 rotates, carrying with it the intermediate freely rotatable gears 70, the gears 70 are caused to rotate by their engagement with the stationary gear 62. Thus the intermediate gears 70 are caused to rotate in the direction of rotation of the support arm. The engagement of the intermediate gears 70 with the planetary gears 72 causes the planetary gears to rotate in the opposite direction. Because the planetary shafts 74 are fixed to the planetary gears 72, the suction cup mounting blocks 80 and their attached suction cups 42 rotate with the planetary gears. By designing the gears in accordance with the locations of the coupon pick-up, the glue applicator and the coupon deposit stations, the suction cups can be made to be in their fully extended position at the time they reach these stations. As shown in the drawings, and as illustrated diagrammatically in FIGS. 6A. 6B and 6C, these stations are located 120° apart with respect to the central shaft 52. By providing the planetary gears 72 with one-third the number of teeth as are on the stationary gear 62, the planetary gears will be caused to rotate three times for every full rotation of the shaft 52. For example, a practical ratio for this arrangement could be twenty teeth on the planetary gears and sixty teeth on the stationary gear.

As seen in FIG. 6A, one of the suction cups, designated 42A for the purpose of this description, is in fully extended position at the lowermost point in its rotation about the center shaft 52, corresponding to the position at which it deposits its coupon onto a moving carton blank. Note that the other suction cup 42B is also pointing in the same direction. By the time the support arm 50 has rotated 60°, as shown in FIG. 6B, the planetary gear shafts supporting the suction cups have rotated three times that amount, or 180°, so that the uppermost suction cup 42B is now in its fully extended condition opposite the glue nozzle 46. The application of glue from the nozzle is timed to coincide with this moment by means which are well known in the art, the details of which do not form a part of this invention. Rotation of the support arm 50 through another 60° to the position shown in FIG. 6C causes the planetary gear shafts and their associated suction cups to rotate another 180° so that the suction cup 42A which was lowermost in FIG. 6A is now in fully extended condition opposite the coupon hopper 44. Further rotation of the support arm through another 60° will cause the device to again be in the position shown in FIG. 6A, although the suction cups 42A and 42B will now be in reversed positions to those of FIG. 6A.

It will be understood that although the operation of the coupon applicator has been described in connection with the application of glue to the coupons from the nozzle 46, glue could be applied instead directly to the carton blanks from a different glue station, thus eliminating the need for the nozzle 46. It is preferred to apply the glue as illustrated, however, to avoid the tendency of glue which is sprayed onto the moving blank to string out on the blank due to the rapid speed at which the blanks are traveling.

Figure 7A:
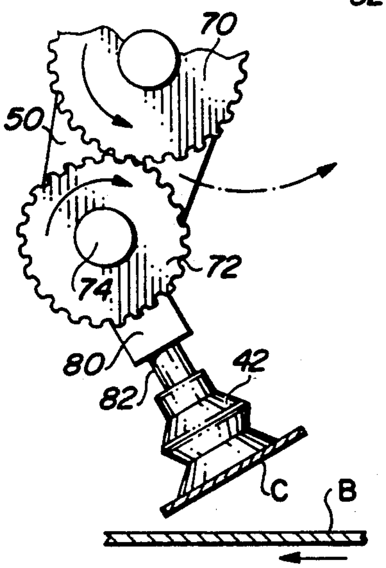
FIGS. 7A, 7B and 7C are enlarged partial side elevations sequentially showing the coupon gripping head as it approaches, applies and leaves a predetermined location on a moving substrate.

Turning to FIG. 7A, the support arm 50 is illustrated as moving counterclockwise toward the lowermost point in its rotation, with the suction cup 42 rotating in a clockwise direction about the planetary shaft 74, moving toward a position where it will be lie in a plane extending through the planetary shaft 74 and the central rotating shaft 52. In an arrangement such as that illustrated in FIG. 4, wherein the three stations are equally radially spaced about the central shaft 52, if the support arm 50 is 15° from the lowermost point in its rotation, the suction cup 42 would be at an angle of 45° from a plane extending through the shafts 52 and 74. At this point the suction cup face and the coupon held thereby are angled as shown with respect to the moving carton blank B, with the lowermost point on the coupon being only a short distance from the blank.

Figure 7B:
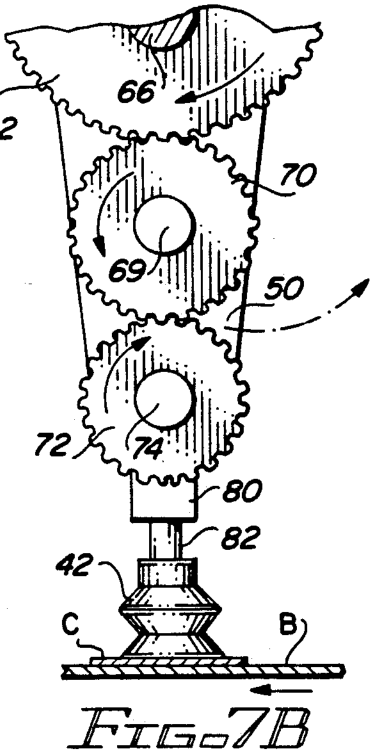

By the time the support arm 50 reaches the vertical position shown in FIG. 7B, the planetary gear 72 and its shaft 74 will have rotated the suction cup in the opposite rotational direction so that it is aligned with the shafts 66, 68 and 78, resulting in the face of the suction cup and the coupon C being parallel to the blank B. The clockwise rotation of the suction cup 42 at the same time that it is being carried in a counterclockwise direction by the support arm 50 results in the end of the cup that was angled close to the blank B in FIG. 7A being raised as the opposite end of the cup is lowered. During this rotational movement about the shaft 74, the movement of the support arm 50 toward the blank B results in the coupon C being parallel to the blank at the time the coupon is lowered into contact with it. This relationship between the coupon C and the moving blank B greatly reduces the risk of nonadhesion between the coupon and blank since the entire surface of the coupon engages the blank at the initial contact between the coupon and blank, rather than only part of the surface, as would be the case if the coupons were applied by a rotary arm not equipped with a planetary gear arrangement.

Figure 7C:
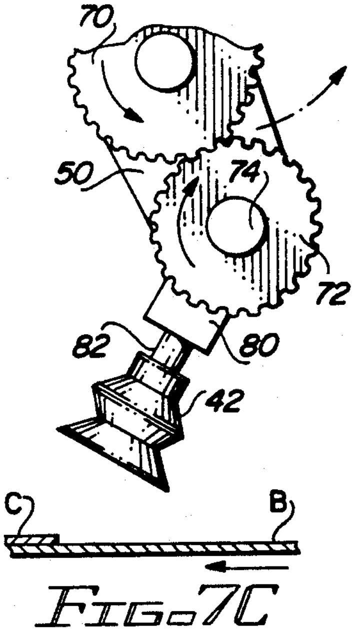

The device in FIG. 7C illustrates the relative positions of the elements after the arm 50 has traveled through an arc from the lowermost point of its travel at FIG. 7B equal to the arc traveled in going from its location of FIG. 7A to FIG. 7B. The suction cup has rotated so as to move away from the blank beneath it in the same manner that it rotated when moving into contact with the blank, resulting in the cup being quickly moved out of contact with the coupon just applied.

It will now be appreciated that the invention provides for extremely rapid operation of a coupon applicator, enabling the use of two suction cups at the same time as well as making possible the optimum placement of the coupon on the moving blank so that it is essentially parallel to the blank at the time it makes initial contact therewith. The planetary motion of the suction cups which enables this type of movement also presents the suction cup to the coupon hopper with its face substantially parallel to the coupon to be picked up and to the glue nozzle with the coupon substantially at right angles to the nozzle spray.

Although no specific details of the construction of the coupon hopper have been disclosed, it will be understood to those in the art that many different structural arrangements are available for this purpose. For example, the hopper may be provided with narrow flanges which are sufficient to hold the coupons in place but are insufficient to prevent the suction cup from pulling the flexible coupon over the flanges and out of the hopper.

Similarly, although no details have been given for the glue applicator other than depicting it as a spray nozzle, any suitable type of glue applicator may be employed so long as the application of glue can be timed to coincide with the appearance of a coupon at the glue station. Since this is such a rapid operation, a spray nozzle has been found to be the preferred glue dispensing means.

It should now be apparent that the invention is not necessarily limited to all the specific details described in connection with the preferred embodiment, but that changes to certain features of the preferred embodiment which do not alter the overall basic function and concept of the invention may be made without departing from the spirit and scope of the invention, as defined in the appended claims.

What is claimed is:

1. Apparatus for depositing a small sheet onto a larger moving substrate, comprising:

a first rotating shaft;

support arm means connected to the first rotating shaft so as to rotate therewith;

a second shaft attached to the support arm means at a location spaced from the first shaft;

sheet holding means mounted on the second shaft;

means causing the sheet holding means to release a sheet held thereby upon reaching a predetermined location on the moving substrate; and planetary gear means for rotating the second shaft to cause the sheet holding means to present the sheet to the predetermined location on the moving substrate in substantially parallel relationship to the substrate.

2. The apparatus of claim 1, wherein the sheet holding means includes vacuum means applied to the sheet, and wherein the means for causing the holding means to release the sheet comprises means for ceasing the application of vacuum.

3. The apparatus of claim 1, wherein the planetary gear means comprises a stationary gear surrounding the first rotating shaft, a freely rotating intermediate gear mounted on the support arm means and meshing with the stationary gear, and a planetary gear fixed to the second shaft and meshing with the intermediate gear, the resulting rotation of the planetary gear causing the second shaft to rotate.

4. The apparatus of claim 1, wherein the rotation of the second shaft by the planetary gear means causes the sheet holding means to hold the sheet at an angle to the substrate just prior to presenting the sheet to the moving substrate.

5. The apparatus of claim 1, including a sheet supply hopper located adjacent the path of rotation of the sheet holding means, the planetary gear means causing the sheet holding means to be presented to the hopper so that the surface thereof for engaging and holding a sheet is substantially parallel to the outermost sheet in the supply hopper.

6. The apparatus of claim 5, including glue applicator means located adjacent the path of rotation of the sheet holding means between the sheet supply hopper and the moving substrate, the planetary gear means causing the sheet holding means to present a sheet held thereby to the path of glue directed by the glue applicator means.

7. Apparatus for depositing small sheets onto larger successive moving substrates, comprising:

a first rotating shaft;

support arm means connected to the first rotating shaft so as to rotate therewith, the support arm means being centrally located on the first shaft and having opposite ends spaced therefrom;

the direction of movement of the support arm means at the point in its rotation nearest the moving substrate being opposite the direction of movement of the substrate;

a second shaft attached to the support arm means adjacent one end thereof and a third shaft attached to the support arm means adjacent the opposite end thereof;

sheet holding means mounted on the second and third shafts;

means causing each sheet holding means to release a sheet held thereby upon reaching a predetermined location on one of two successive moving substrates; and means for rotating the second and third shafts in a direction opposite the direction of rotation of the first shaft to cause the sheet holding means mounted thereon to present the sheets held thereby to the predetermined location on successive moving substrates in substantially parallel relationship to the substrates.

8. The apparatus of claim 7, wherein the means for rotating the second and third shafts comprise planetary gear means.

9. The apparatus of claim 8, including a sheet supply hopper located adjacent the path of rotation of the sheet holding means, the planetary gear means causing the sheet holding means to be presented to the hopper so that the surface thereof for engaging and holding a sheet is substantially parallel to the outermost sheet in the supply hopper.

10. The apparatus of claim 8, wherein the rotation of the second and third shafts by the planetary gear means causes the sheet holding means to hold their sheets at an angle to the substrate just prior to presenting the sheet to the moving substrate.

11. The apparatus of claim 10, wherein the planetary gear means causes the sheet holding means to be extended the maximum distance from the first shaft.

12. The apparatus of claim 8, wherein the planetary gear means comprises a stationary gear surrounding the first rotating shaft, two freely rotating intermediate gears mounted on the support arm means on opposite sides of the stationary gear and meshing therewith, and two planetary gears fixed to the second and third shafts, each planetary gear meshing with the adjacent intermediate gear, the resulting rotation of the planetary gears causing the second and third shafts to rotate.

13. Apparatus for picking up a small sheet and adhering the same to a moving substrate, comprising:

a first rotating shaft;

support arm means connected to the first rotating shaft so as to rotate therewith;

the direction of movement of the support arm means at the point in its rotation nearest the moving substrate being opposite the direction of movement of the substrate;

a second shaft attached to the support arm means at a location spaced from the first shaft;

sheet holding means mounted on the second shaft;

a sheet supply hopper located adjacent the path of rotation of the sheet holding means;

glue applicator means located adjacent the path of rotation of the sheet holding means between the sheet supply hopper and the moving substrate;

means causing the sheet holding means to remove a sheet from the supply hopper, to hold the sheet in the path of the glue applicator and to release the sheet upon reaching a predetermined location on the moving substrate; and means for rotating the second shaft in a direction opposite the direction of rotation of the first shaft to cause the sheet holding means to be presented to the sheet supply hopper and to the predetermined location on the moving substrate in substantially parallel relationship thereto.

14. The apparatus of claim 13, wherein the means for rotating the second shaft comprises planetary gear means, and wherein the sheet supply hopper, the glue application means and the point of release of the sheet from the sheet holding means are equally radially spaced from each other.

15. The apparatus of claim 14, wherein the planetary gear means comprises a stationary gear surrounding the first rotating shaft, a freely rotating intermediate gear mounted on the support arm means and meshing with the stationary gear, and a planetary gear fixed to the second shaft and meshing with the intermediate gear, the resulting rotation of the planetary gear causing the second shaft to rotate, the stationary gear having three times the number of gear teeth as does the planetary gear.

* * * * *